United States Patent
Ettlinger, Jr. et al.

[15] 3,670,911
[45] June 20, 1972

[54] SILVERWARE LOADING APPARATUS

[72] Inventors: Ralph Ettlinger, Jr., Highland Park; Frederick P. Strobl, Jr., Park Ridge, both of Ill.

[73] Assignee: Avant Industries, Inc., Wheeling, Ill.

[22] Filed: July 31, 1970

[21] Appl. No.: 59,940

[52] U.S. Cl. ................................................214/312
[51] Int. Cl. ...........................................B65b 21/02
[58] Field of Search...............................198/30, 33 AA, 107; 214/311–312; 221/169

[56] References Cited

FOREIGN PATENTS OR APPLICATIONS 1,382,936  11/1964  France................................214/312
707,918   4/1931   France................................198/30

Primary Examiner—Edward A. Sroka
Attorney—McDougall, Hersh & Scott

[57] ABSTRACT

An apparatus for loading silverware onto an adjacent surface such as a silverware sorting construction. The apparatus comprises a rotating drum having an opening or openings in its side wall for the passage of silverware out of the drum. A removable receptacle may be located in the drum for loading the drum with silverware. As the drum rotates, the silverware is removed from the drum at a relatively regular rate.

8 Claims, 5 Drawing Figures

PATENTED JUN 20 1972 3,670,911
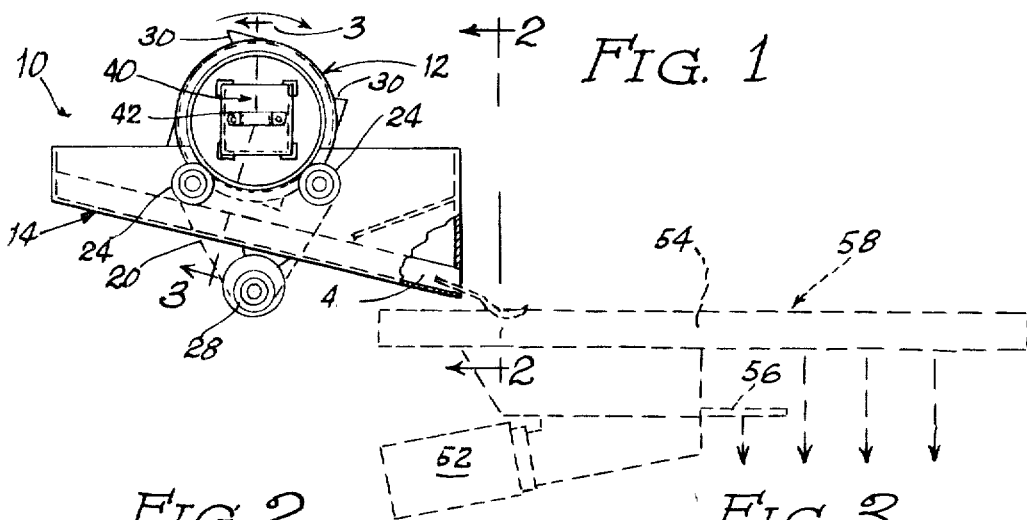
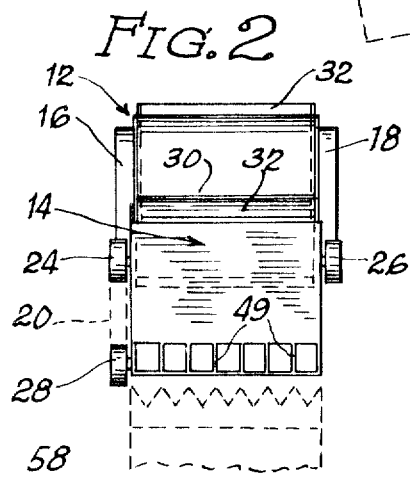
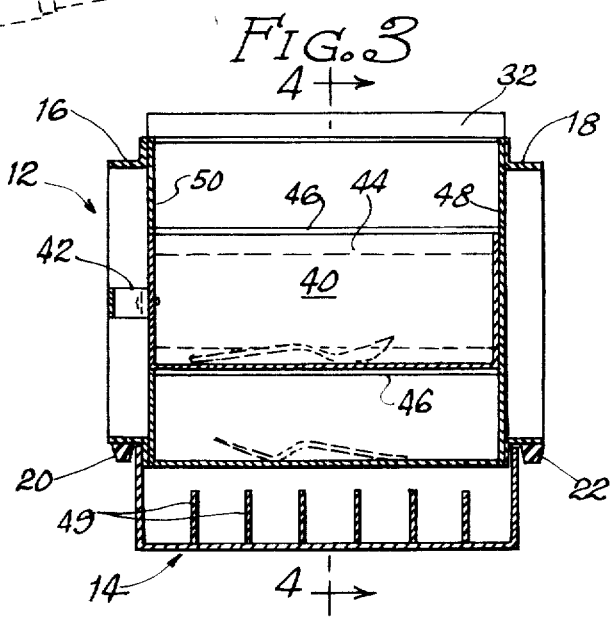
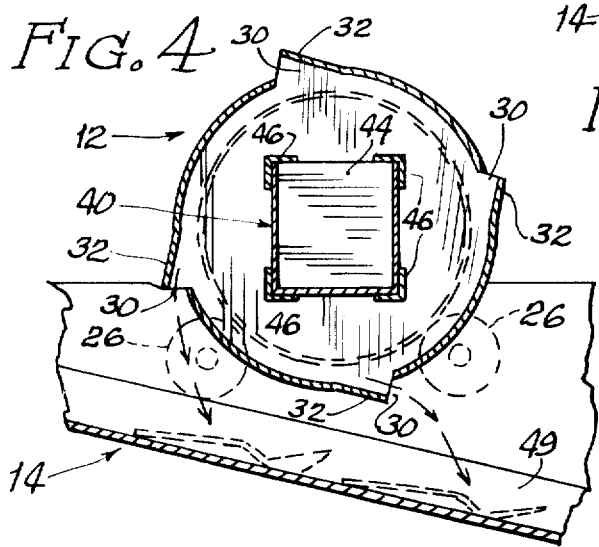
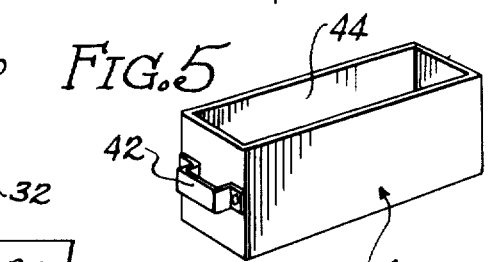
INVENTORS
Ralph Eitlinger, Jr.
Frederick P. Strobl, Jr.
by McDougall, Hersh and Scott
Attys

SILVERWARE LOADING APPARATUS

This invention relates to an apparatus used for the handling of silverware. In particular, the apparatus is designed for use in loading silverware onto a silverware sorting construction or onto any other adjacent surface, the silverware being loaded at a regular rate so that the sorting construction or other means will receive a regular supply of silverware.

The construction of this invention is particularly designed for use in institutions such as school, restaurant and industrial cafeterias which handle large volumes of tableware when providing food service. Typical cafeteria-style operations utilize plates, saucers, cups, glasses, silverware and cafeteria trays, and these items much be collected and in some fashion washed and then reused. In order to minimize the inventory of tableware which is required, it is desirable to provide efficient washing systems so that tableware can be reused one or more times during a single eating period.

In many instances, efficient tableware washing is frustrated because of the necessity for manually handling various items. Typically, separate stacks of soiled trays, plates, etc. are formed, and these items are then manually loaded into dishwashing racks or onto conveyors for passage through automatic dishwashing equipment. Additional manual handling of at least some items is required to restack the items after washing.

Applicants' copending applications Ser. No. 828,510, now U.S. Pat. No. 3,609,767 entitled "Vibrating Sorter For Soiled Tableware" and Ser. No. 851,937, now U.S. Pat. No. 3,584,752 "entitled "Tableware Tray Tilting And Conveying Means" describe systems for automatic separation and handling of various items of tableware. Copending application Ser. No. 23,855 entitled, "Silverware Sorter" describes a means for sorting silverware as an operation apart from the sorting of other items of tableware. Copending application Ser. No. 60,020, entitled "Silverware Sorting Means" describes an alternative system for the separate handling of silverware.

As described in the last mentioned applications, special problems occur where silverware sorting and washing are concerned. Pieces of silverware represent a proportionally higher number of pieces when compared with any other particular tableware item. Accordingly, it is most important to provide means which are as efficient as possible in the handling of silverware to minimize labor costs, to save time in the overall dishwashing operation and to eliminate handling of clean silverware prior to use in the dining area. The structure described in the applications directed to silverware sorting means do provide arrangements which are uniquely suitable for the handling of silverware whereby individual silverware pieces can be automatically placed in a silverware receptacle dispenser designated for that particular piece. A great deal of manual handling is thus eliminated.

Where automatic silverware sorting equipment is employed, it is preferable to locate silverware on the sorting equipment in metered amounts so that jams or other disruptions in the equipment operation will not occur. This can be accomplished by having an individual place silverware on a sorting bed in regular amounts with the attendant making sure that the silverware is not delivered to the sorter in amounts which would cause problems. The use of manual labor for this task is, however, undesirable from a cost and reliability standpoint. Relatively expensive equipment such as a vibrating hopper could be used as an alternative.

It is a general object of this invention to provide an improved construction for use in the handling of silverware in automatic dishwashing operations.

It is a more specific object of this invention to provide an improved construction for loading silverware onto automatic silverware sorting equipment or onto other structures, the silverware being loaded at a regular rate in accordance with the needs of associated equipment.

These and other objects of this invention will appear hereinafter and for purposes of illustration, but not of limitation, specific embodiments of the invention are shown in the accompanying drawings in which:

FIG. 1 is a side elevational view of a silverware loading construction characterized by the features of this invention;

FIG. 2 is an elevational view of the construction taken about the line 2—2 of FIG. 1;

FIG. 3 is an enlarged cross-sectional view of the construction taken about the line 3—3 of FIG. 1;

FIG. 4 is a cross-sectional view of the construction taken about the line 4—4 of FIG. 3; and, FIG. 5 is a perspective view of a silverware receptacle utilized in the construction.

The loading apparatus of the instant invention generally comprises a drum having supporting means positioned in its interior. A removable silverware receptacle is adapted to be positioned on the supporting means. This receptacle is placed in the drum loaded with silverware, and an opening is defined by the receptacle. Means are provided for rotating the drum is conjunction with the receptacle so that the silverware in the receptacle is eventually discharged from the receptacle into the drum.

The side wall of the drum preferably defines a plurality of axially extending openings. The silverware is discharged from the drum through these openings during rotation of the drum. The openings are designed so that large amounts of silverware will not pass through at one time. This arrangement provides a regular discharge of silverware from the drum, and this provides an ideal combination of the loading apparatus and a silverware sorting construction.

The silverware discharged from the drum is preferably passed to a delivery chute. This delivery chute may include separate passages for directing the silverware to a silverware sorting means. These passages are particularly desirable where separate paths for silverware movement are defined by the sorting means whereby each of these paths will be independently fed by the loading construction.

The loading construction 10 shown in the accompanying drawings comprises a drum 12 and a delivery chute 14. In this embodiment, the drum defines hub portions 16 and 18 which are supported on belts 20 and 22. These belts extend around idler rolls 24 and 26. One belt is also positioned around drive pulley 28 whereby the drum 12 can be rotated. It will be appreciated that various other means may be employed for providing driving movement to the drum.

The drum 12 includes a plurality of openings 30 which extend axially of the drum. These openings are formed by means of wall portions 32 which extend tangentially relative to the outer drum surface. The size of the openings is such that any piece of silverware rotated in the drum will pass through the openings; however, a plurality of pieces, one on top of the other, will be restricted from passing through these openings.

Silverware is loaded in the drum through the use of the box 40. This box carries a handle 42 and it defines an open top 44. Four angle members 46 are located within the drum. These angle members extend between the back wall 48 and the front wall 50 of the drum and preferably the space between the angle members is square so that the square box 40 can be loaded with the open top in the upward position irrespective of which of the angle members are aligned for receiving the box in this position.

During periods of continuous use of the loading mechanisms, a box 40 is placed in the drum while the drum is rotated. This box will be filled with silverware either manually or, when used in conjunction with tableware sorting constructions of the type described in the foregoing applications, a box 40 may be located in position for collecting silverware from the sorting construction. By providing a plurality of boxes 40, one or more boxes can be located in position for receiving silverware from a sorting construction while another box is positioned in the loading means. When the box in the loading means has emptied, a full box can be located in its place.

In the operation of the loading construction, a box 40 filled with silverware will gradually rotate so that pieces of silverware will tumble out of the box. In the meantime, pieces of silverware will be discharged through the openings 30; however, this discharge will take place on a regulated basis while other pieces accumulate for discharge at a later time. In the meantime, the box 40 will be emptied whereby a full box can be inserted in the drum. It will be noted that even if the discharge opening of a box is in a downwardly directed position, a full box can be immediately inserted in its place with the discharge opening in the upward position.

When the silverware is discharged, it falls onto the chute 14. A plurality of vertically extending walls 49 are carried by the chute, and these walls locate pieces of silverware in line for movement down the chute. Where the loading means is used in conjunction with an automatic sorting means, then each of the passages defined between the walls 49 may be aligned with one of the troughs defined by a sorting means. The loading construction is particularly suitable for use in conjunction with a sorting system 58 which corresponds with the system described in one of the aforementioned applications. In this sorting system, a vibrating motor 52 is employed for moving the silverware along an upper bed 54 and a lower bed 56. A similar vibrating arrangement may be connected with the delivery chute 14 to encourage movement of pieces over the surface of this delivery chute, however, the attitude of the chute can also be such that all pieces will move down the chute toward its discharge end solely under the influence of gravity.

The drum preferably rotates at a slow rate in the order of about 5 to 10 revolutions per minute. This relatively slow rotation is desirable in order to maintain uninterrupted rotation while still permitting loading of a box while the drum is rotating. The constant rotation speed which is preferred will also lead to substantial regularity in the rate of pieces being delivered to the sorting construction.

It will be understood that various changes and modifications may be made in the above described construction which provide the characteristics of this invention without departing from the spirit thereof particularly as defined in the following claims.

That which is claimed is:

1. An apparatus for loading silverware onto an adjacent structure comprising a drum, supporting means located in the interior of the drum, a removable silverware receptacle positioned on said supporting means, said receptacle defining an opening for the passage of silverware out of said receptacle, means for rotating said drum at least a sufficient number of degrees whereby said receptacle opening is periodically positioned for dumping silverware from the receptacle into the interior of said drum, and at least one opening defined in the side wall of said drum, said drum opening being designed to prevent the passage of any large amount of silverware out of the drum at any one time but being sufficiently large to permit the passage of a small amount of silverware therethrough whereby said silverware is discharged at a relatively regular rate from the drum as the drum rotates.

2. An apparatus in accordance with claim 1 wherein said supporting means comprises brackets attached between the end walls of said drum, said receptacle being slideable axially of said drum and relative to said brackets during insertion and removal of the receptacle.

3. An apparatus in accordance with claim 2 wherein said brackets are designed to receive said receptacle in a variety of positions relative to the side walls of the drum whereby said receptacle can be inserted in the drum with the receptacle opening positioned substantially upwardly irrespective of the position of rotation of the drum.

4. An apparatus in accordance with claim 3 wherein said receptacle comprises a box defining square ends and said brackets comprise angle members adapted to engage the corners of the box.

5. An apparatus in accordance with claim 1 wherein said drum opening comprises a slot extending axially of the drum.

6. An apparatus in accordance with claim 5 wherein a plurality of openings are defined in the side wall of the drum for the passage of silverware, said openings being positioned in spaced apart relationship around the periphery of the drum.

7. An apparatus in accordance with claim 6 wherein said means for rotating the drum turn the drum at a rate between about 5 and 10 rotations per minute.

8. An apparatus in accordance with claim 1 including a delivery chute positioned beneath said drum for collecting pieces of silverware passing from the drum opening, said delivery chute having a plurality of upstanding walls extending in spaced relationship across the surface of the chute, said walls defining passages extending from the discharge end of said chute.

* * * * *